No. 12,201. REISSUED MAR. 1, 1904.

J. A. GRAY & F. LEHMANN.

NON-EXPLOSIVE OIL CAN.

APPLICATION FILED MAY 6, 1903.

Witnesses:
F. E. Gaiche.
Herbert Bradley.

Inventors:
John A. Gray
Frederic Lehmann
by Christy & Christy
Attys.

No. 12,201. Reissued March 1, 1904.

UNITED STATES PATENT OFFICE.

JOHN ALEXANDER GRAY AND FREDERIC LEHMANN, OF ALLEGHENY, PENNSYLVANIA, ASSIGNORS, BY DIRECT AND MESNE ASSIGNMENTS, TO SAID GRAY, J. R. SMITH, AND NATHAN L. BROWN, OF ALLEGHENY, PENNSYLVANIA.

NON-EXPLOSIVE OIL-CAN.

SPECIFICATION forming part of Reissued Letters Patent No. 12,201, dated March 1, 1904.

Original No. 644,738, dated March 6, 1900. Application for reissue filed May 6, 1903. Serial No. 155,952.

*To all whom it may concern:*

Be it known that we, JOHN ALEXANDER GRAY and FREDERIC LEHMANN, citizens of the United States, of America, residing at Allegheny, in the county of Allegheny and State of Pennsylvania, have invented certain new and useful Improvements in Non-Explosive Oil-Cans; and we do hereby declare the following to be a full, clear, and exact description thereof, reference being had to the accompanying drawings, which form a part of this specification.

Our invention relates to a non-explosive oil-can; and it consists in providing the ordinary oil-can with a tube extending from the exit-nozzle to a point near the base of the can and also the provision of a vent to admit air to the said can, together with certain details of construction and combination of parts, as will be fully described hereinafter.

Figure 1:
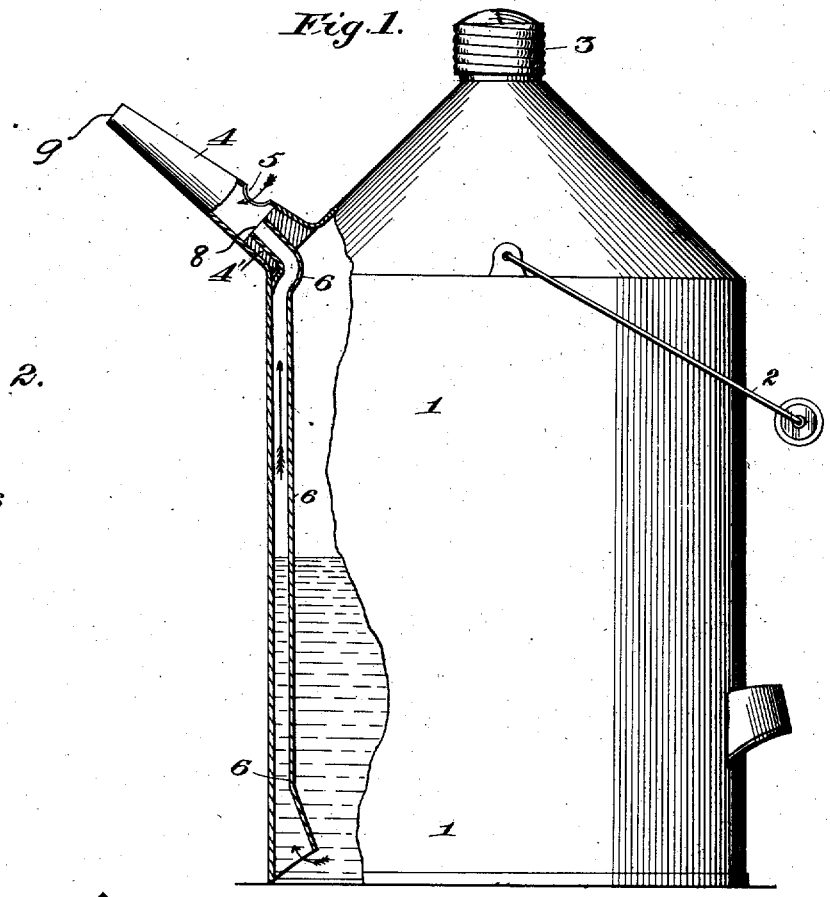
Figure 2:
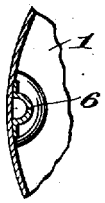
Figure 3:
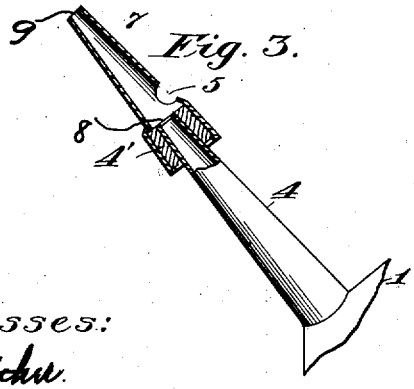
Figure 4:
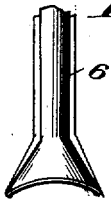

In the accompanying drawings, Figure 1 is a side elevation of an ordinary oil-can such as is now in common use, the same being provided with our improved non-explosive attachment. Fig. 2 is a sectional plan view of the same, showing the inner tube or passage. Fig. 3 is a modified form of a spout for attachment with any oil-can. Fig. 4 is a front view of the lower end of the tube or passage.

We have illustrated in Fig. 1 an oil-can of common form, consisting of the body portion 1, bail 2, screw-cap 3, and spout or nozzle 4. The base of the spout 4 is flaring, as usual, and is provided with a filling 4′, of cork or other suitable material, to form the inlet-opening 8 into the spout of a diameter as small as and preferably slightly less than the outlet or the mouth 9 of the spout. In the top of the spout or nozzle 4, at a point at or near its base, is a vent or opening 5, which is larger than the outlet or mouth 9, and consequently larger than the inlet-opening 8. Connected to the cork filling 4″ at the base of this spout 4 is a tube or passage 6, which extends to a point near the base of the can and is the only exit for the oil leaving the same. The entrance at the base of this tube is flared. When the can is tilted, the oil entering the tube or passage 6 will find a free outlet from the spout 4, as the vent 5 will permit sufficient air to enter the can.

As long as the oil pours from the nozzle the danger is being carried from the can and not toward it. The danger therefore arises from the flame following the receding stream as the pour of oil is stopped. Our device provides that as the oil in nozzle 4 recedes the vacuum created is filled by inrushing air. As the orifice 5 is several times larger than the point 9 of nozzle 4, naturally the air thus introduced drives the flame away from the body of oil remaining in the can. The flames are thus held at bay till the oil in the can is practically out of the range of the fire.

From experiments which we have made we believe the foregoing to be the correct explanation of the manner in which the nozzle shown and described operates to prevent explosion; but whether this be the correct explanation or not we have found that by the use of such nozzle explosion is prevented.

In Fig. 3 of the drawings we have shown a detachable spout 7, embodying our invention, which is capable of being fitted to the end of the spout of any oil-can. The end of the spout of the can is inserted in the inlet-opening of the detachable spout.

Having thus described our invention, we claim—

1. A spout for oil-cans having an inlet-opening of an area less than the transverse area of any other portion of the spout, and an opening in the top of the spout between the inlet and outlet openings, substantially as set forth.

2. A spout for oil-cans, having a reduced inlet-opening, and an opening in the top of the spout between the inlet and outlet openings, said top opening being of larger size than the inlet-opening, substantially as described.

3. A spout for oil-cans, having inlet and outlet openings, and a larger opening in the top of the spout between said inlet and outlet openings, substantially as described.

4. A spout for oil-cans, having in its top and between its inlet and outlet openings, an opening larger than its inlet-opening, substantially as described.

5. A non-explosive oil-can, consisting of the oil-can 1, provided with a spout, a vent 5 formed in the said spout at a point near the base of the same, a cork or plug 4′ arranged in the interior of the spout located between the vent and the body of the can, an opening through the said cork or plug, a downwardly-extending tube or passage 6 secured in the said opening, said tube or passage terminating at a point near the base of the can, the entrance of which is enlarged to freely admit the fluid, and the exit at the top contracted to a less diameter than the exit of the spout, all arranged and combined for service, substantially as described.

In testimony whereof we have hereunto affixed our signatures in the presence of two subscribing witnesses.

JOHN ALEXANDER GRAY.
FREDERIC LEHMANN.

Witnesses:
HAVER HEINZ,
C. J. WEITERSHAUSEN.